United States Patent
Zill et al.

(10) Patent No.: US 7,516,049 B2
(45) Date of Patent: Apr. 7, 2009

(54) WIRELESS PERFORMANCE ANALYSIS SYSTEM

(75) Inventors: Brian D. Zill, Bellevue, WA (US); Alastair Wolman, Seattle, WA (US); Jitendra D. Padhye, Redmond, WA (US); Paramvir Bahl, Sammamish, WA (US); Ranveer Chandra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/680,575

(22) Filed: Feb. 28, 2007

(65) Prior Publication Data

US 2008/0201109 A1 Aug. 21, 2008

Related U.S. Application Data

(60) Provisional application No. 60/890,611, filed on Feb. 19, 2007.

(51) Int. Cl.
G06F 11/30 (2006.01)

(52) U.S. Cl. .............. 702/186; 370/241; 455/435.1; 709/223

(58) Field of Classification Search ............ 702/186; 370/352, 338, 241; 455/411, 435.1, 426.1, 455/432, 432.2; 709/223, 225
See application file for complete search history.

(56) References Cited

U.S. PATENT DOCUMENTS

| | | | |
|---|---|---|---|
| 5,054,111 A * | 10/1991 | Goodwin | ............ 455/509 |
| 5,526,357 A | 6/1996 | Jandrell | |
| 6,088,588 A | 7/2000 | Osborne | |
| 6,249,252 B1 | 6/2001 | Dupray | |
| 6,782,256 B2 | 8/2004 | Engholm et al. | |
| 6,782,351 B2 * | 8/2004 | Reichel et al. | ............ 702/188 |
| 6,957,067 B1 * | 10/2005 | Iyer et al. | ............ 455/435.1 |
| 7,000,015 B2 | 2/2006 | Moore et al. | |
| 7,030,811 B2 | 4/2006 | Goren et al. | |
| 7,035,652 B1 | 4/2006 | Kelkar | |
| 7,110,779 B2 | 9/2006 | Billhartz et al. | |
| 7,113,794 B2 | 9/2006 | Annamalai | |
| 7,120,420 B2 | 10/2006 | Karaoguz et al. | |
| 7,236,460 B2 * | 6/2007 | Wu et al. | ............ 370/241 |
| 7,286,515 B2 * | 10/2007 | Olson et al. | ............ 370/338 |
| 7,295,524 B1 * | 11/2007 | Gray et al. | ............ 370/254 |
| 7,333,800 B1 * | 2/2008 | Gopinath | ............ 455/411 |
| 7,339,914 B2 * | 3/2008 | Bhagwat et al. | ............ 370/338 |
| 2003/0135762 A1 | 7/2003 | Macaulay | |
| 2005/0058151 A1 | 3/2005 | Yeh | |
| 2005/0169185 A1 | 8/2005 | Qiu et al. | |

(Continued)

OTHER PUBLICATIONS

Layland, "Understanding Wi-Fi Performance," Business Communications Review, Mar. 2004, pp. 34-37.

(Continued)

Primary Examiner—Carol S Tsai
(74) Attorney, Agent, or Firm—Lee & Hayes, PLLC

(57) ABSTRACT

Wireless adapters are installed on one or more general purpose computing devices and are connected via a wireless network in an enterprise environment. The adapters are densely deployed at known locations throughout the environment and are configured as air monitors. The air monitors monitor wireless signals transmitted between transceiver devices and access points and records information about these signals. One or more analysis or inference engines may be deployed to analyze the signals received from the air monitors to obtain optimum performance and connectivity information about the wireless network.

17 Claims, 7 Drawing Sheets

U.S. PATENT DOCUMENTS

| | | | |
|---|---|---|---|
| 2005/0190732 | A1 | 9/2005 | Douglas et al. |
| 2005/0201300 | A1 | 9/2005 | Bridgelall |
| 2005/0254474 | A1* | 11/2005 | Iyer et al. ................ 370/338 |
| 2005/0276276 | A1 | 12/2005 | Davis |
| 2006/0036406 | A1 | 2/2006 | Skidmore et al. |
| 2006/0068769 | A1 | 3/2006 | Adya et al. |
| 2006/0199558 | A1 | 9/2006 | Chiodini et al. |
| 2006/0224730 | A1* | 10/2006 | Fok et al. ................ 709/224 |
| 2006/0268906 | A1 | 11/2006 | Kneckt |
| 2006/0270400 | A1 | 11/2006 | DaSilva et al. |
| 2007/0004394 | A1 | 1/2007 | Chu et al. |
| 2008/0008159 | A1* | 1/2008 | Bourlas et al. ............ 370/352 |

OTHER PUBLICATIONS

Muthukrishnan, et al., "FLAVOUR—Friendly Location-aware Conference Aid with Privacy Observant ArchitectURe" available at least as early as <<Jan. 9, 2007>>, at <<http://wwwhome.cs.utwente.nl~muthukrishnank/papers/00000136.pdf>>, at pp. 1-12.

Muthukrishnan, et al., "Towards Smart Surroundings: Enabling Techniques and Technologies for Localization", available at least as early as <<Jan. 9, 2007>>, at <<http://wwwes.cs.utwente.nl/smartsurroundings/publications/Muthukrishnan05b.pdf>>, 2007, pp. 13.

Wang, et al., "Solutions to Performance Problems in VoIP Over a 802.11 Wireless LAN," IEEE Transactions on Vehicular Technology, vol. 54, No. 1, Jan. 2005, pp. 366-384.

Xylomenos, et at., "TCP Performance Issues over Wireless Links," IEEE Communications Magazine, Apr. 2001, pp. 52-58.

Yang, et al., "Web Browsing Performance of Wireless Thin-client Computing," Twelfth International World Wide Web Conference (WWW2003), 2003, pp. 1-12.

Bahl, et al., "Enhancing the Security of Corporate Wi-Fi Networks Using DAIR", Mobile Systems, applications and services, 2006, pp. 1-14.

Bulusu, et al., "Self-Configuring Localization Systems: Design and Experimental Evaluation", ACM Transactions on Embedded Computing Systems (TECS), Feb. 2004, vol. 3, No. 1, 34 pgs.

Patwari, et al., "Locating Nodes: Cooperative Localization in Wireless Sensor Networks", IEEE Signal Processing Magazine, vol. 22, No. 4, Jul. 2005, pp. 54-69.

Savvides, et al., "A Self-Configuring Location Discovery System for Smart Environments", Workshop for pervasive computing and networking, 2005, 12 pgs.

* cited by examiner

WIRELESS PERFORMANCE ANALYSIS SYSTEM

CROSS REFERENCE TO RELATED MATTERS

This application claims benefit of U.S. provisional application No. 60/890,611 filed on Feb. 19, 2007.

BACKGROUND

Network diagnostics and management are becoming more prominent as the number of networks grows. Industry has primarily focused network diagnostics and management on wired networks in general, and on wide area Internet failures in particular. However, many companies are evolving towards enterprise wireless networks to become more productive. As a result, the problems associated with securing and managing wireless networks have become more prominent.

Industry has provided some commercial offerings in the area of wireless network management using two common approaches. The first common approach is to rely on Access Points (APs) for monitoring wireless networks. The second common approach is to use dedicated and often expensive custom hardware sensors for monitoring the network. The companies that offer products in these areas rarely discuss the mechanisms they use to detect problems. For example, there are many different levels of sophistication that one can provide when solving the security problems of rogue wireless equipment, but companies do not disclose their mechanisms used to implement their solutions.

The approach that relies on APs for monitoring wireless networks is certainly cost effective, but it has several limitations. First, an AP can not easily monitor multiple channels, or associate with other nearby APs, since the AP's primary function requires it to spend most of its time on one specific channel serving associated clients. Second, the APs usually have limited CPU power and memory resources so it is not practical to poll APs (e.g., issued SNMP (Simple Network Management Protocol) queries) too frequently. Third, the level of detail that typical commercial APs provide with their response (i.e., through their SNMP interfaces) is quite limited. Fourth, APs tend to be closed platforms so one cannot load and run third-party code on an AP, making it difficult to quickly deploy new functionality. Finally, an AP only provides a view of one end of the wireless communication, so an AP-based solution can not be used to detect problems such as radio frequency (RF) holes or excessive interference that primarily affect the client end of the communication.

Another common approach of using dedicated hardware sensors for RF monitoring deploys special sensor nodes throughout the wireless network. Industry has also augmented the AP-based monitoring by deploying these special sensor nodes throughout the organization. However, the specialized sensors are quite expensive.

Systems available today can not satisfactory determine specific information needed to improve reliability and performance of a wireless network. Specifically administrators need to know access point placement, areas of the network where clients consistently experience poor performance or areas of the network where there is no coverage. By determining this specific information the network administrator can take concrete steps to improve their network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein are, among other things, embodiments of various technologies for use in wireless network management. In accordance with one embodiment described herein, wireless adapters are installed on one or more general purpose computing devices connected to one or more networks in an enterprise environment. Such general purpose computers may be configured as air monitors. The air monitors are used to monitor one or more wireless networks to detect a location of a transceiver and are generally densely deployed throughout the enterprise. One or more analysis engines (e.g., inference engines) may be deployed in a server and may be in communication with the air monitors through a wireless access point or Ethernet.

Each application built to use the framework installs an application-specific filter that runs inside an air monitor and an application-specific inference component that runs on one of the inference engines in the server. The inference engines control the air monitors by assigning them specific monitoring tasks. The data gathered by the monitors is stored in one or more databases. The data may be retrieved by the server to be analyzed using one or more inference engines, which also perform computationally intensive analysis tasks.

The air monitors have device drivers for communicating with the wireless adapter and an air monitor service for monitoring wireless networks. The air monitors receive packets transmitted between wireless devices. Performance information about the wireless devices is stored by each of the air monitors including the number of packets transmitted between the wireless devices. An inference engine server retrieves the performance information stored by the air monitor that has a highest level of confidence, e.g. has the highest packet count of the packets transmitted, for further analysis in diagnosing the networks performance. The air monitors may also store and aggregate connectivity information about the transmitted wireless signal to assist in diagnosing proper transceiver and access point placement.

Other advantages will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Overview

This disclosure is directed to a system that uses many wireless transceivers (air monitors) to detect the performance of wireless transceivers. The air monitors may include a computer which is operated by a user.

Performance information is determined from the wireless packets sent by the transceiver that are captured by the air monitors and stored in a data store (e.g. a database). Examples of the signal performance information may include a number of packets lost in transmission, a rate of packet transmission, a packet loss rate at transmission speed (physical data rate) or a number of bytes transmitted at each transmission speed. An inference engine examines certain stored performance information stored by the air monitors to determine which of the air monitors has a highest level of confidence, e.g. which air monitor had the highest packet count for the wireless packets received during a predetermined time period. The inference engine then aggregates and provides other stored performance information stored by the air monitor having high confidence to an application for further analysis in diagnosing the network.

In another embodiment, the air monitors monitor the wireless signals transmitted between transceiver devices and access points to obtain connectivity information. The connectivity information is aggregated and stored by the air monitors and submitted to the inference engine. The inference engine aggregates information submitted by all the air monitors to assist in proper placement of the access points with respect to the transceivers.

A system using wireless performance analysis as disclosed may enable the monitoring of data transfers between transceiver devices and access points so that connectivity problems may be detected. Various examples of using the wireless performance analysis system to diagnose performance and connectivity within a wireless network are described below with reference to FIGS. 1-7.

Example System Architecture

Figure 1:
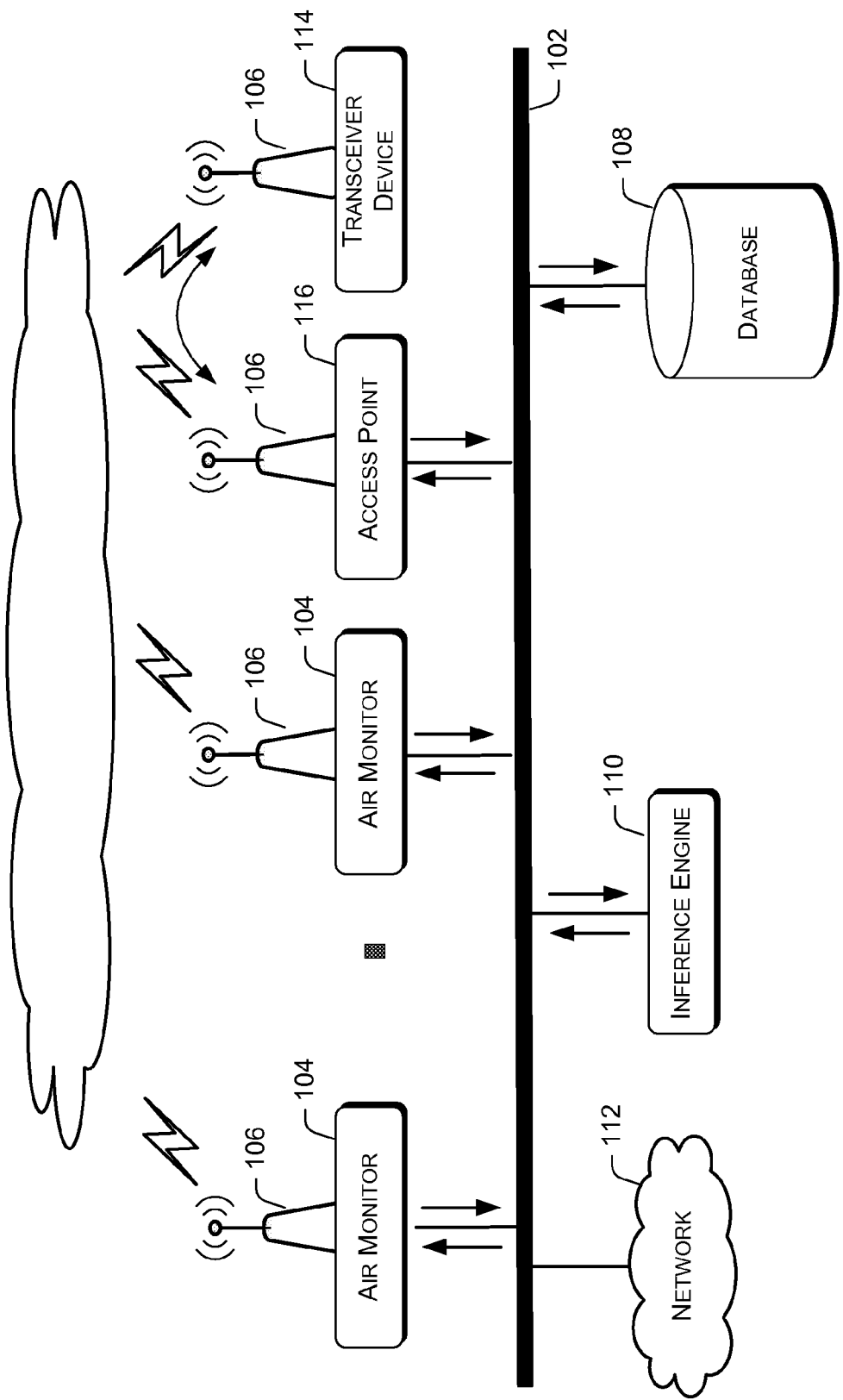
FIG. 1 illustrates an exemplary architecture of a dense array of inexpensive radios (DAIR), in which a wireless performance analysis system may be implemented.

FIG. 1 illustrates an exemplary architecture of a dense array of inexpensive radios (DAIR), of a wireless performance analysis system. DAIR may allow for wireless management applications to be built that benefit from dense radio frequency (RF) sensing. One such DAIR architecture is described in co-pending U.S. patent application Ser. No. 11/474,652 filed Jun. 26, 2006, entitled "Platform for Enterprise Wireless Applications," the teachings and disclosure of which are hereby incorporated in their entirety by reference thereto.

As discussed in co-pending U.S. patent application, DAIR may provide a framework or architecture 100 for detecting and diagnosing faults in wireless network using existing desktop infrastructure. As shown in FIG. 1, the framework may include a wired network 102, one or more air monitors 104 equipped with wireless adapters 106, a database 108, an inference engine 110 that may be connected to the Internet 112, transceiver device 114 equipped with a wireless adapter 106, and access point 116 also equipped with wireless adapter 106. Air monitors 104 may be used to monitor transmissions between transceiver device 114 and access point 116. Although one transceiver device 114 and one access point 116 is depicted in FIG. 1, the network may include multiple transceiver devices in communication with multiple access points, and air monitors 104 may monitor transmission between the multiple transceiver devices and the multiple access points.

The target transceiver device 114 may comprise a general computing device equipped with a wireless adapter 106. In one embodiment, the air monitors 104 are general purpose desktop personal computing (PC) devices assigned to users (e.g., employees) that are connected to wired network 102. Although the air monitors 104 are depicted as a desktop PC, and the target transceiver device 114 is depicted as a general computing device, the air monitors 104 and transceiver device 114 may be implemented as any of a variety of conventional computing devices including, for example, a server, a notebook or portable computer, a workstation, a mainframe computer, a mobile communication device, a PDA, an entertainment device, a set-top box, an Internet appliance, and a game console.

Air monitors 104 may be located at fixed positions in the enterprise environment. The air monitors 104 may cause their wireless adapters 106 to operate in a "promiscuous" mode to listen continuously, either on a fixed channel, or in scan mode on a sequence of channels. For example, if a transceiver device 114 is communicating with an access point 116 that conforms to the IEEE 802.11 standard, each of the air monitors 104 may configure their wireless adapter to receive all 802.11 frames, including those destined for other 802.11 stations. In other words, the air monitors 104 may be configured to monitor all wireless traffic that is being transmitted. Accordingly, different air monitors 104 may be used to observe and to analyze the same communication between a particular transceiver device 114 and a particular access point 116.

The data received by the air monitors 104 may be stored in a data store, such as, for example, database 108. Although a database 108 is illustrated, the data from the air monitors may be stored in other types of memory including, but not limited to, a server memory or a memory of inference engine 110. Database 108 may include an interface module (not shown) that enables it to communicate with the inference engine 110 and air monitors 104 via the wired network 102.

The data residing in database 108 may be analyzed by inference engine 110. Inference engine 110 may also control the air monitors 104 by assigning them specific monitoring tasks. Additionally, inference engine 110 may provide data to additional applications via a network 112.

While database 108 and inference engine 110 are described in the singular, one will readily appreciate that a plurality of databases 108 and inference engines 110 may be configured to serve the same function in other embodiments.

Figure 2:
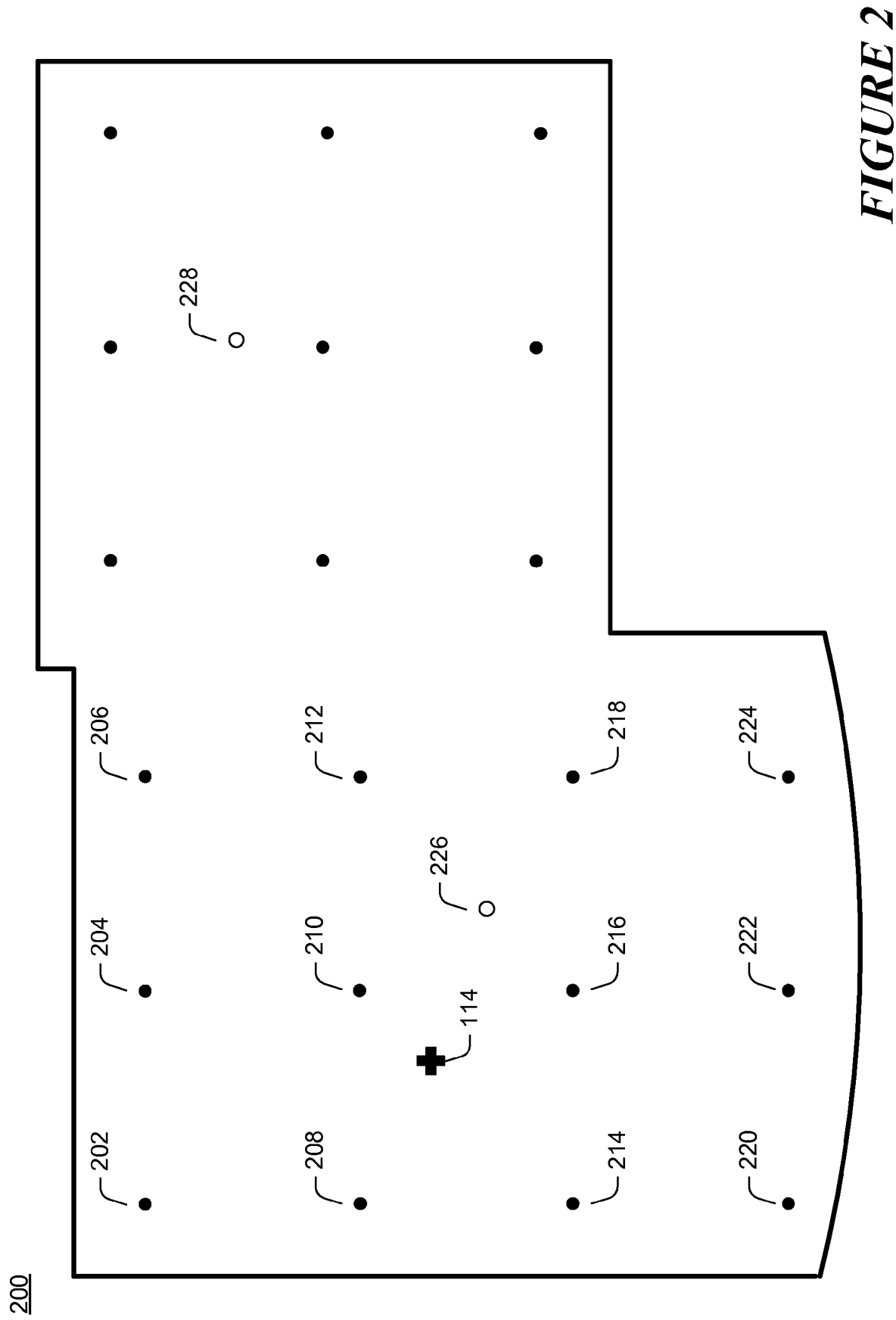
FIG. 2 illustrates the deployment of the wireless performance analysis system in a representative enterprise environment.

FIG. 2 illustrates the deployment of the wireless performance analysis system in a representative enterprise environment. As illustrated, the representative enterprise includes a transceiver device 114, and air monitors 202-224 and access points 226 and 228. Air monitors 202-224 may monitor the communication between the transceiver device 114 and the access point 226 or access point 228.

Figure 3:
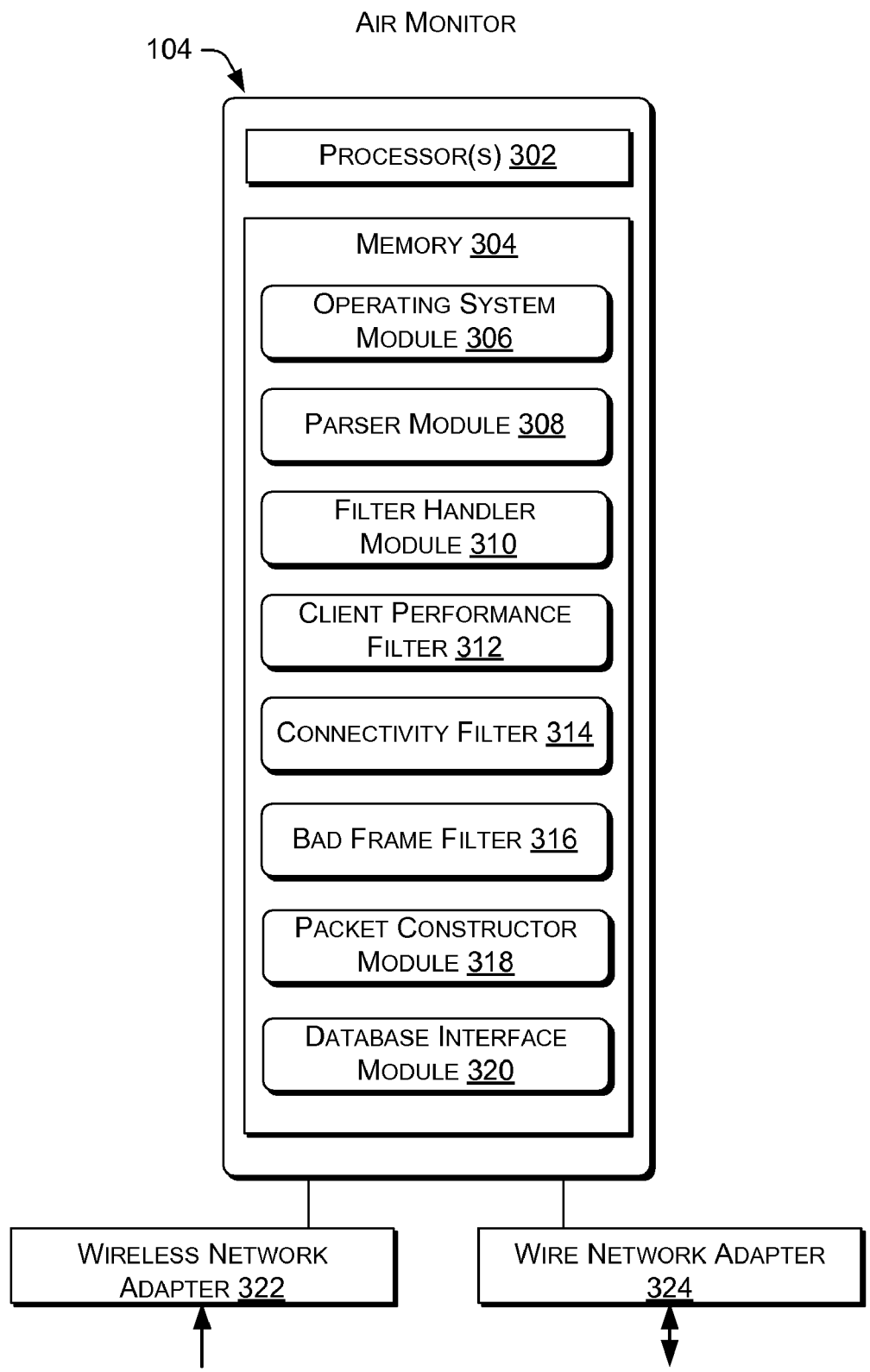
FIG. 3 illustrates a block diagram illustrating selected modules in an air monitor of the wireless performance analysis system.

In FIG. 3, there is shown a simplified block diagram 300 illustrating selected modules in one of the air monitors 104 of the wireless performance analysis system shown in FIG. 1. The air monitor 104 has process capabilities and memory suitable to store and execute computer-executable instructions. In one example, the air monitor 104 includes one or more processors 302 and memory 304. The memory 304 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system. As discussed above, in some embodiments, air monitors 104 may be desktop computers that are each equipped with a wireless network adapter 322. One example of adapter 322 is a USB 802.11 wireless adapter card. Additionally, each of the air monitors 104 may also be equipped with wire network adapter 324.

Stored in memory 304 of the air monitor 104 are operating system module 306, parser module 308, filter handler module 310, packet constructor module 318, and database interface module 320. A client performance filter 312, a connectivity filter 314, and a bad frame filter 316 are also stored in memory 304. These modules and filters may be implemented as software or computer-executable instructions that are executed by the one or more processors 302. Air monitor 104 may also include a wireless network adapter 322 and a wire network adapter 324.

The operating system module 306 includes an operating system that communicates with the other modules of the air monitor 104 to receive, process, and exchange data. For example, for an air monitor 104 that includes a desktop computer, the operating system module 306 may include a Microsoft® Windows-based operating system distributed by Microsoft Inc. of Redmond, Wash. In addition, the operating system module 306 may also enable air monitor 104 to communicate with other devices across the wired network 102 via wire network adapter 324.

The filter handler module 310 may be employed to monitor transmissions between a transceiver device 114 and an access point 116. Specifically, the filter handler module 310 may be configured to receive frames via the wireless network adapter 322 and a wireless device driver.

In one embodiment, the filter handler module 310 may be further configured to perform address matching in cases where the frames received are 802.11 frames, such as frames in signals transmitted between an access point and a transceiver. Generally speaking, there are two types of 802.11 frames, namely the clear-to-send (CTS) and acknowledge (ACK) frames, which do not contain the media control access (MAC) address of the device that transmitted the frames. This means that when air monitor 104 listens to 802.11 conversations; it cannot directly determine which transceiver device 114 or access point 116 sent the packets.

Filter handler module 310 may perform address matching by inferring and then obtaining both transmitter identification and a Basic Service Set Identifier (BSSID) for CTS and ACK frames. To determine the transmitter of an ACK frame, the filter handler module 310 may analyze the packets that arrive at the air monitor 104 back-to-back. If the first frame type is a Data or Management frame, then the filter handler module 310 temporarily stores the value of the Duration header for that frame. When the next frame arrives, the filter handler module 310 determines whether the frame is an ACK frame that has arrived within the time period specified by the Duration header. If it has, the filter handler module 310 may ascertain that the receiver of the first frame must be the transmitter of the ACK frame. Next, the filter handler module 310 may use ToDS and FromDS bits in the header of the first frame to determine the correct BSSID to attribute to the ACK frame.

To determine the device that transmitted the CTS frame, the filter handler module 310 may take advantage of the fact that the duration of a CTS frame covers the time period when the actual data frame will be sent, and that the receiver address in the CTS frame should match the transmitted address of the following frames. Once the transmitter and BSSID fields are obtained, filter handler module 310 may then pass on the frames to other modules and filters.

Additionally, the filter handler module 310 may further employ parser module 308 to analyze and summarize the frames. In this way, the parser module 308 may improve the scalability of the system without imposing an undue CPU burden on the air monitor 104.

Moreover, the filter handler module 310 may employ the client performance filter 312 to provide performance statistics on the monitored transmission between transceiver device 114 and access point 116. In one embodiment, the client performance filter 312 may maintain a large set of aggregate counters for each transceiver device 114 and access point 116 pair. For example, the aggregate counters may track the total number of frames and bytes transferred, the total number of management frames, and the total number of frames that are Media Access Control (MAC)-layer retransmissions. In embodiments of the air monitor 104 that specifically monitor 802.11 frames, the client performance filter 312 may be configured so that it only increments the aggregate counters for frames of the transceiver device 114 and access point 116 pair whose transmitter address was inferred.

In other embodiments, the client performance filter 312 may also collect histograms that enable auto-rate analysis. The histograms include the number of packets transmitted at each of the possible physical data rates, number of packets received and the number of bytes transmitted at each of the rates.

In additional embodiments, the client performance filter 312 may be configured to analyze packet loss. In order to analyze packet loss during downlink traffic, the client performance filter 312 may be set up to infer that certain packets were transmitted even though the air monitor 104 did not detect them. For example, when one of the air monitors 104 observes a data frame with a sequence number it has not seen before and a retry bit is set on that data frame, the air monitor 104 may infer that an initial data frame with that same sequence number was transmitted.

In further embodiments, the client performance filter 312 may also obtain additional information from ACKs that travel in the reverse direction, as the ability of the filter hander module 310 to address match 802.11 frames may enable the client performance filter 312 to correctly attribute the transmitter of the ACKs. The various embodiments of the client performance filter 312 may provide an estimate of the combined number of management and data frames transmitted. Further, by analyzing the difference between the number of inferred transmitted frames and the actual observed number of transmitted frames, the various embodiments of the client performance filter 312 may provide an estimate of packet loss rate.

Moreover, in order to analyze packet loss during uplink traffic, the client performance filter 312 may be configured to analyze gaps in the sequence number space to infer additional information regarding the number of frames transmitted. Specifically, because transceiver device 114 when operating in infrastructure-mode only communicates with one access point at a time, the client performance filter 312 may analyze gaps in the sequence number space to further infer traffic that a particular air monitor 104 has missed.

However, transceiver device 114 may periodically perform scanning by changing channels to search for other nearby access points. Nevertheless, most transceiver device 114 may typically send a Data Null frame to the access point 116 with the power-save bit set just before switching channels, so that the access point 116 will buffer any incoming data. Following scanning, transceiver device 114 will generally send Data Null with a power-save bit cleared. Accordingly, in some embodiments, the client performance filter 312 may be configured to analyze Data Nulls to avoid attributing these gaps as communication between the transceiver device 114 and an access point 116.

In additional embodiments, the client performance filter 312 may be configured to discard an inferred counter, as obtained by analyzing sequence number gaps, when the transceiver device 114 engages in certain behavior. For example, when the transceiver device 114 begins by communicating with a first access point 116 (AP1), switches to a second access point 116 (AP2), and then later switches back to AP1, an air monitor 104 may not see any of the communication with AP2 because this communication may have taken place on a different channel. Accordingly, in these embodiments, the client performance filter 312 may be configured to discard the inferred counter when the transceiver device 114 engages in this behavior.

Following the analysis described above, the client performance filter 312 may submit the analysis summaries (i.e., aggregated counters), such as a summary of the number of packets received in a given time period between a transceiver and access point, to the database 108 using the database interface module 320 and wire network adapter 324. In some embodiments, the client performance filter 312 may be configured to submit the summaries using random interval to avoid having a plurality of air monitors 104 submit in a synchronous manner, thus making the load on the database more uniform. In one particular embodiment, the random interval may be between 30 and 60 seconds. In other embodiments, the air monitor 104 may use the database interface module 320 to send summaries at regular intervals.

The filter handler module 310 may also employ a connectivity filter 314 to record the sequence of association steps executed by transceiver device 114. In certain embodiments, this information may be recorded in a memory of the air monitor 104 as a connectivity table. Specifically, the connectivity table records this information as a sequence of association states. For example, the connectivity table may contain information such as the MAC address of the transceiver device 114, Basic service set identifier (BSSID), association state, number of frames (NumFrames), number of frames acknowledged (NumAcked), the total RSSI of all packets, along with a start and end timestamp. The current association state for transceiver device 114 represents the last known management packet type that was exchanged between the client and the AP with the corresponding BSSID.

In one embodiment, each transceiver can be in one of twelve association states, corresponding to Probe Request Sent, Probe Response Received, Authentication Request Sent, Authentication Response Received, Association Request Sent, Association Response Received, Disassociation Request Sent by transceiver, Disassociation Request sent by AP, Reassociation Request sent by transceiver, Deauthentication sent by transceiver, Deauthentication sent by AP, or data packets sent by the transceiver or AP.

Typically, the connectivity filter 314 checks every incoming packet (other than Probe Request or Probe Response) to see if it changes the current association state of transceiver device 114, and if so, the filter generates a new entry in the connectivity table. If the entry already exists, the air monitor updates the end timestamp for the particular association state. For each packet, the air monitor also updates the number of frames that were seen between the transceiver and the AP in the corresponding association state, along with the total RSSI of all packets. However, the connectivity table may not have any information about transceiver device 114 when idle, or when transceiver device 114 is disconnected and has ceased attempting to associate to any AP.

In another embodiment, the connectivity filter 314 may be configured to determine that status of transceiver device 114 when positioned in a radio frequency (RF) hole, that is, a region with inadequate wireless network coverage. Specifically, the connectivity filter 314 may periodically cause the air monitor 104 to send out beacons pretending to be a valid AP, in an attempt to induce transceiver device 114 when in the RF hole to initiate the association process. Generally, the beacons may be marked using an Information Element (IE) so that the filters of other air monitors 104 may ignore these frames. In each of the embodiments, the filter handler module 310 may store the connectivity table in the database 108 using the database interface module 320 and the wire network adapter 324.

In a further embodiment, the connectivity filter 314 may cause the air monitor 104 to send out beacons in response to probes from a transceiver device 114 if device 114 is a suspected rogue device. In this instance, the inference engine 110 may use the connectivity filter 314 to detect network attacks.

Each air monitor periodically submits the state table to the database 108, and deletes the existing table. The inference engine aggregates the table from multiple air monitors as discussed later to determine the location of each client, along with all its connection states.

The inference engine can use the association table to determine the location of an RF Hole. In one embodiment, the inference engine determines that a client is in an RF Hole if either the client is in a state where the communication is only one way, i.e. client's packets are not being acknowledged by the AP, or the AP's packets are not being acknowledged by the client. In the case that the client is only sending Probe Requests without receiving a Probe Response, the Inference Engine concludes that the client is in an RF Hole.

The Inference Engine can also use the association table to determine devices 114 which frequently change their association state, and their locations. A client that frequently changes association will have a number of state transitions in the association table.

The filter handler module 310 may employ a bad frame filter 316 to locate non-compliant transceiver devices, which may be transceiver device 114. In some instances, a transceiver device 114 may become a non-compliant transceiver device due to errors in hardware and/or driver software bugs. In some cases, such malformed frames may cause problems for access point 116.

In one embodiment, the bad frame filter 316 may be configured to log non-compliant 802.11 frames. Once the non-compliant 802.11 frames are logged, the bad frame filter 316 may submit the raw contents of bad frames in a state table to the database 108 via database interface module 320, as long as the frame checksum is correct. Moreover, as further described below, the localization and report generating functions are carried out by an inference engine, such as inference engine 110.

Figure 4:
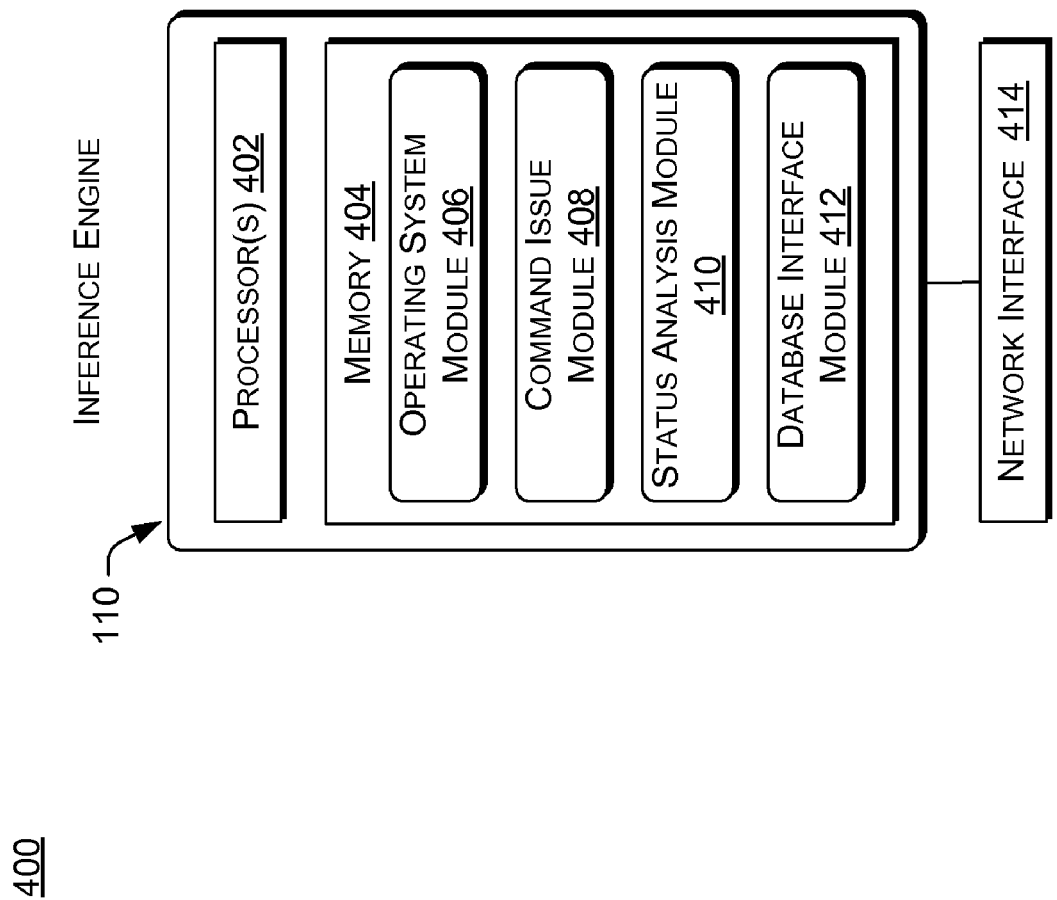
FIG. 4 illustrates a block diagram illustrating selected modules in an inference engine of the wireless performance analysis system.

FIG. 4 is a block diagram 400 illustrating selected modules in an inference engine 110 of the wireless performance analysis system shown in FIG. 1. Specifically, the inference engine 110 may be used to perform computationally intensive analysis tasks associated with detecting a transceiver device 114. In some embodiments, the inference engine 110 may be a dedicated computer. However, in other embodiments, the inference engine 110 may reside on an end-user's desktop.

The inference engine 110 has process capabilities and memory suitable to store and execute computer-executable instructions. In this example, inference engine 110 includes one or more processors 402 and memory 404. The memory 404 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 404 are operating system module 306, command issue module 408, status analysis module 410, and database interface module 412. The modules may be implemented as software or computer-executable instructions that are executed by the one or more processors 402. The inference engine 110 may be further equipped with a network interface 414.

The operating system module 406 contains an operating system that may enable the other modules of the inference engine 110 to receive, process, and exchange data. In addition, the operating system module 406 may also enable inference engine 110 to communication with other devices across wired network 102. For example, for an inference engine 110 that is based on a desktop computer, the operating system module 406 may include a Microsoft® Windows-based operating system.

The command issue module 408 may enable the inference engine 110 to issue new commands to one or more air monitors 104. For example, the inference engine 110 may use the command issue module 408 to request the one or more air monitors 104 to monitor a channel that is different from the current channel being monitored. In another example, the inference engine 110 may request that one of the air monitors 104 attempt to associate with an AP in order gather more information.

The inference engine 110 may employ the database interface module 412 to retrieve aggregated counter summaries in a state table from a database 108 via the network interface 414 and the wired network 102. Typically, the inference engine 110 retrieves new aggregated summaries by issuing periodic queries to the database 108 via database interface module 412. However, in some embodiments, the inference engine 110 may retrieve new aggregated summaries on demand or directly from one of the air monitors 104.

The inference engine 110 may use the status analysis module 410 to track the performance of a wireless local area network (LAN) with respect to transceiver device 114. In some embodiments, the status analysis module 110 may use the aggregated counter summaries, as obtained from the air monitors 104, to determine which air monitor is best able to hear a particular communication between a transceiver device 114 and an access point 116.

As described above, different air monitors 104 may be employed to observe and analyze the same communication between a specific transceiver device 114 and a specific access point 116. In some instances, each of the different air monitors 104 may be performing its analysis based on incomplete views of this communication. Accordingly, in one embodiment, the inference engine 110 may employ the status analysis module 410 to select, during a particular time interval, one or two air monitors 104 that have the highest confidence, i.e. were best able to overhear each direction of the communication. In other words, the inference engine 110 may select the best one of the air monitors 104 for the uplink, and the best of the air monitors 104 for the downlink.

In some instances, the one of the air monitors 104 that is best able to overhear the uplink communication may not be the same one of the air monitors 104 that is best able to overhear the downlink communication. Nevertheless, the inference engine 110 will generally select one of the air monitors 104 that is physically close to the one of the transceiver device 114 or access point 116. In turn, the air monitor 104 with the highest level of confidence in receiving the wireless signals from transceiver device 114, or access point, may be identified to optimize the particular enterprise application desired. In one embodiment, the air monitor with the highest level of confidence will be the air monitor that had the highest packet count recorded in a given time period.

In instances where the communication between a transceiver device 114 and access point 116 conforms to the 802.11 standard, the one or more air monitors 104 may need to overhear frames flowing in both directions. In other words, in order for the inference engine 110 to accurately estimate 802.11 packet losses, each of the air monitors 104 analyzing frames flowing in one direction may need to be able to overhear the corresponding ACK frames flowing in the opposite direction. Generally speaking, ACKs are not transmitted at rates higher than 24 Mbps, which means that it is typically easier for each of the air monitors 104 to overhear the ACKs than it is to overhear high data-rate frames such as those sent at 48 or 54 Mbps. Accordingly, particular embodiments of the inference engine 110 that deals with such instances may use packet counts, i.e., most packets overheard, during a given time interval to select one or two air monitors 104 that are best able to overhear the particular conversation.

However, in some situations, the strategy of using the most packets overheard, as employed by air monitors 104, may be in potential conflict with the randomized data submission strategy used by the client performance filter 312, as described previously. Thus, in additional embodiments, the inference engine 110 may further configure the status analysis module 410 to avoid being biased toward choosing one of the air monitors 104 that submitted data most recently. Specifically, the inference engine may be configured to analyze summary data over a timescale that is significantly longer than the data submission interval. For example, in one particular embodiment, the inference engine 110 may be configured with a 15 minute analysis interval, versus a 30 to 60 second submission interval for the client performance filter 312.

In other embodiments, the inference engine 110 may employ the status analysis module 410 to aggregate the information submitted by one or more connectivity filter 314 of the air monitors 104. The aggregated information may enable a network administrator to answer questions related to the management of the network. For example, the network administrator may ascertain whether there are any regions with no RF coverage, or any correlation between connection durations and locations.

Status analysis module 410 may use the database interface module 412 to retrieve a connectivity table in a state table from database 108. Next, status analysis module 410 may sort the connectivity tables by timestamp. The status analysis module 410 may use the time synchronization across air monitors 104 to coalesce the same event seen by the air monitors 104. Subsequently, the status analysis module 410 may perform a post processing analysis over the coalesced sequence of events using knowledge of the 802.11 protocol's association procedure. For example, an association step should precede any data packets between a transceiver and an AP.

The inference engine does not need to go through the entire table for every row in the connectivity table. If every air monitor is synchronized within 1 millisecond, then for every row in the connectivity table, the inference engine processes only those rows with an end time of 1 ms greater than the row being processed.

The RSSI and number of frames count for a transceiver is summed for all the association states seen by an air monitor over a given time interval. This value across all air monitors is used to determine the location of the transceiver.

The aggregation of information by the status analysis module 410, as described, may advantageously enable the characterization and location of RF Holes even when communication is possible in only one direction. The aggregation of information may also provide the ability to infer the duration of client associations to an AP, as well as locate the regions where clients cannot maintain stable associations, such as those that may cause a transceiver device 114 to rapidly switch between APs.

In addition, the inference engine 110 may use the status analysis module 410 to analyze non-compliant frames. In one embodiment, the status analysis module 410 may use the database interface module 412 to retrieve the non-compliant frames in a state table from the database 108. Once retrieved, status analysis module 410 may be configured to detect one or anomalies with the non-compliant frames. For example, the status analysis module 410 may detect that a non-compliant frame carries a valid Frame Type (Control), but an invalid SubType. In another example where the communication standard is 802.11, the status analysis module 410 may detect that the FromDS and ToDS bits in the header of the non-compliant frame are both set to a value of 1, which is disallowed by the 802.11 standard.

In alternative embodiments, the status analysis module 410 may be employed in conjunction with a location analysis module as discussed in the U.S. provisional patent application No. 60/890,614 entitled, "Self-Configuring Wireless Network Location System," filed on Feb. 19, 2007, the content of which is hereby incorporated by reference. The employment of the status analysis module 410, in combination with a location analysis module, may enable the inference engine 110 to ascertain the location of the transceiver device 114, or one of the access points 116, responsible for transmitting the non-compliant frames. Accordingly, the connectivity information obtained, including possible RF hole locations, as well as the identity and location of the equipment responsible for bad frames, may be provided by the inference engine 110 to an application via a network interface 414.

Exemplary Process

Figure 5:
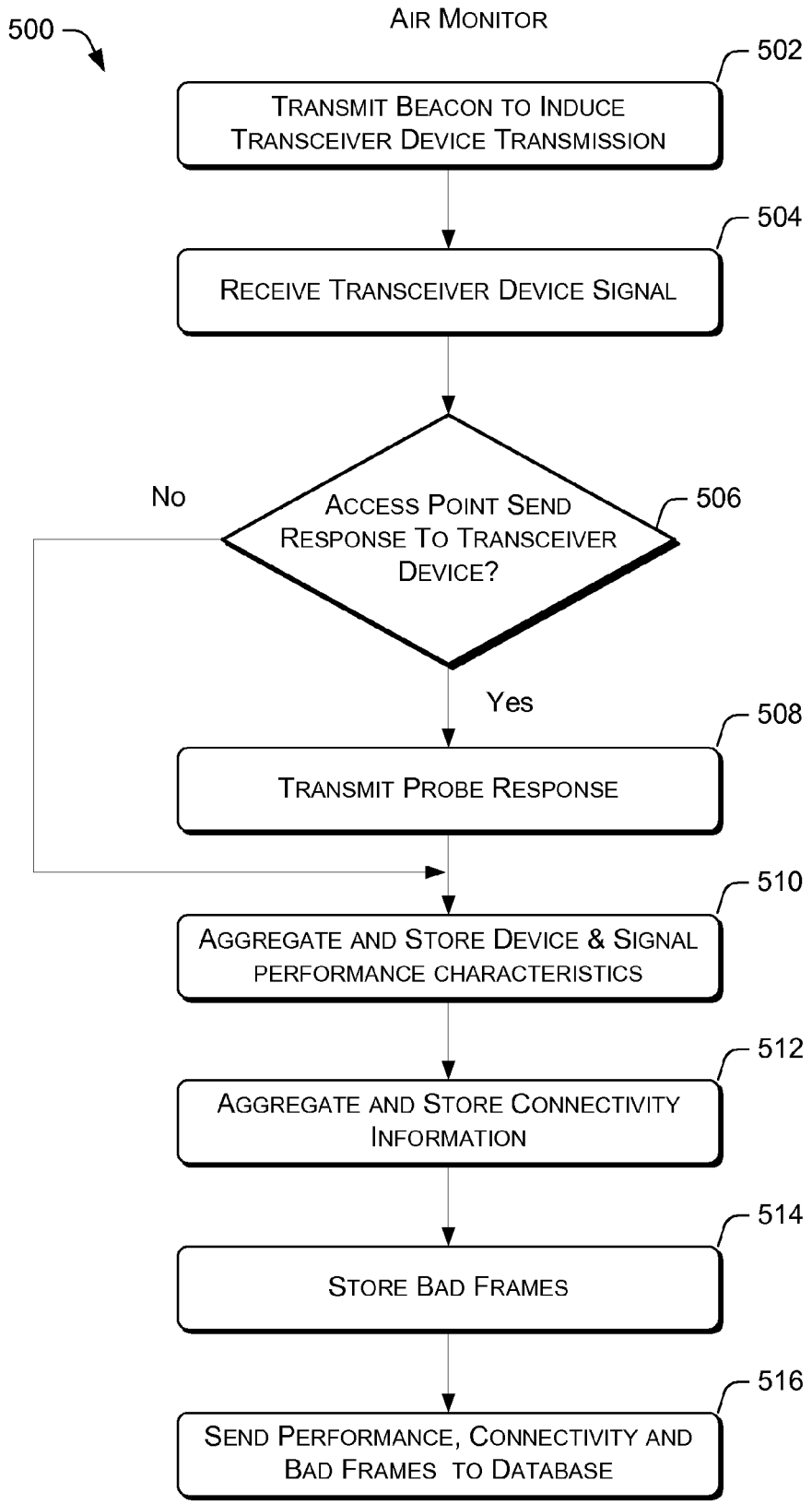
FIG. 5 illustrates a flow diagram of an exemplary process used by an air monitor of the wireless performance analysis system to detect network performance and connectivity problems.
Figure 6:
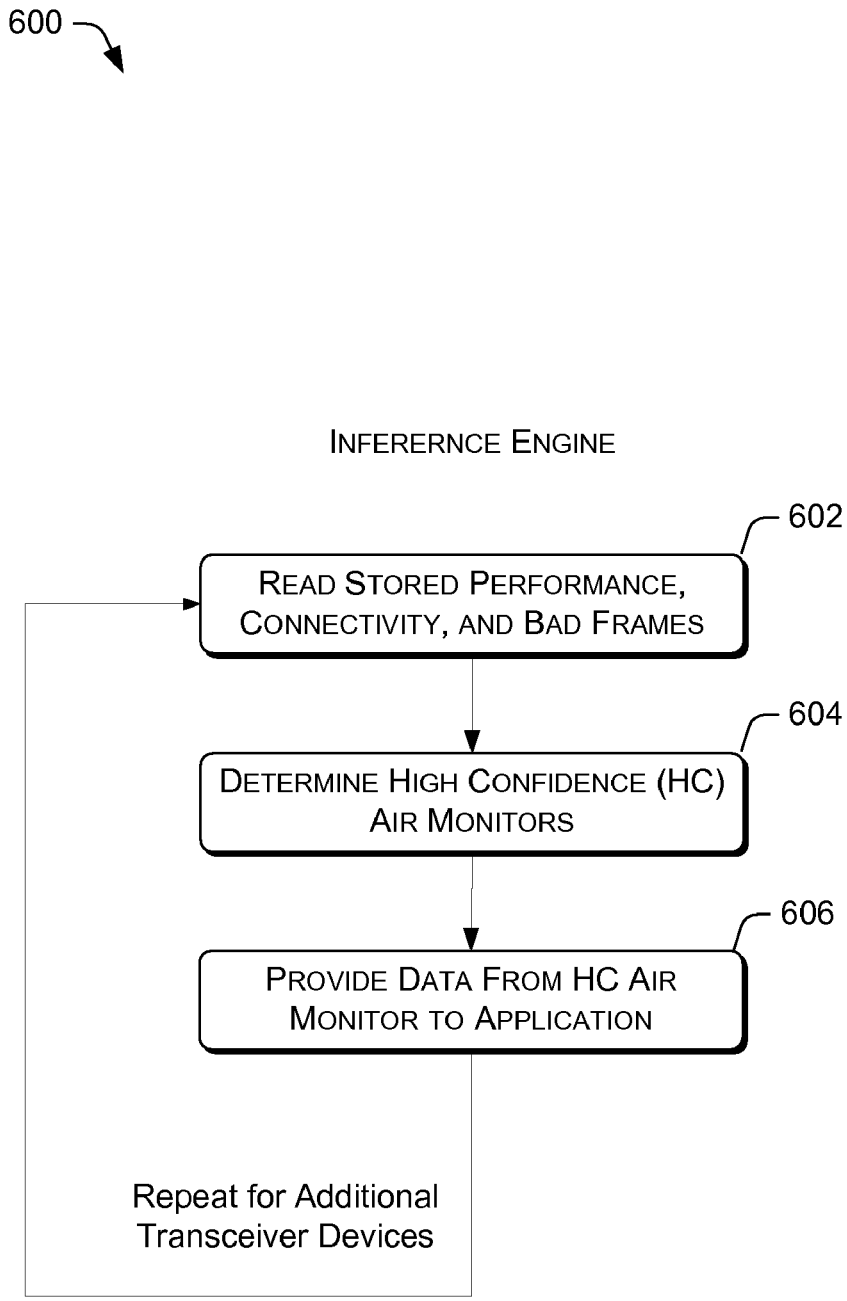
FIG. 6 illustrates a flow diagram of an exemplary process used by an inference engine of the wireless performance analysis system to determine a high confidence air monitor data.
Figure 7:
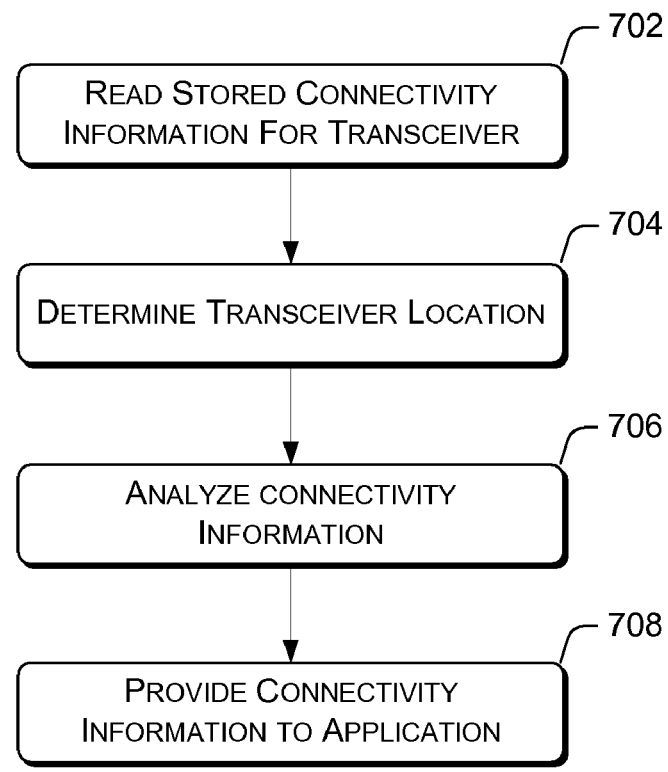
FIG. 7 illustrates a flow diagram of an exemplary process used by an inference engine of the wireless performance analysis system to determine wireless network connectivity information.

The exemplary processes in FIGS. 5-7 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to system 100 of FIG. 1, although it may be implemented in other system architectures.

FIG. 5 illustrates a flow diagram of an exemplary process 500 used by one of the air monitors 104 of the wireless performance analysis system, as shown in FIG. 1, to detect network connectivity and problems. Although the flow diagram is depicted in the order of blocks shown, blocks 502-516 do not have to be implemented in any particular order. At block 502, an air monitor 104 may pretend to be an AP. Specifically, the air monitor 104 may employ filter handler module 310 to activate a connectivity filter 314 to transmit beacons to a transceiver device 114. The beacons may induce the transceiver device 114 to attempt to associate with the air monitor 104. At block 504, the air monitor 104 may receive an association signal from the transceiver device 114.

At decision block 506, the air monitor 104 may make a decision as to whether a response should be sent back from the air monitor 104 in response to the association signal from an access point. If the air monitor 104 determines that a response should be sent ("yes" to decision block 506), the air monitor 104 may transmit a probe response to the transceiver device at block 508. In one example the air monitor may determine to transmit a response if the transceiver device 114 or access point 116 did not respond to a request from the other within a given time period. Once the response is transmitted, the air monitor 104 may then proceed in block 510 to aggregate and store summaries of device characteristics and the signal performance characteristics in a state table using the client performance filter 312. As discussed previously, device and signal characteristics may include packet loss. However, if the air monitor 104 determines that a response should not be sent, because in one example the access point did not response, ("no" to decisions block 506), the air monitor 104 may proceed directly to aggregate and store summaries of device characteristics and the signal performance characteristics in block 510.

At block 512, the air monitor 104 may aggregate and store connectivity information in the state table of database 108 using the connectivity filter 314. As described above, connectivity information may include information such as the name of the transceiver device 114 attempting to associate, BSSID, state, number of frames (NumFrames), number of frames acknowledged (NumAcked), along with a start and end timestamp.

At block 514, the air monitor 104 may store the bad frames, that is, non-compliant frames using the bad frame filter 316. As described above, frames may become non-compliant due to errors in hardware and/or driver software bugs. At block 516, the data stored at block 510, 512, and 514 by the respective filters 312-316, may be transmitted as a state table to the database 108 by the database interface module 412. This data may include performance, connectivity and bad frame data.

FIG. 6 illustrates a flow diagram of an exemplary process 600 used by an inference engine 110 of the wireless performance analysis system, as shown in FIG. 1, to determine a high confidence air monitor data. At block 602, the inference engine 110 may read the data previously stored by one or more air monitors 104 from the state table in data base 108 using data interface module 412. This data may include performance, connectivity and bad frame information. At block 604, the inference engine 110 may determine the high confidence air monitors using analysis module 410 by analyzing packet summaries stored in a state table in database 108 by air monitors 104 when they overheard communication between a transceiver device 114 and an access point 116, and analyzed the uplink and downlink communications. At block 606, a summary of stored performance data from the air monitor 104 having the highest level of confidence, may be provided to a particular enterprise application or stored in database using database interface module 412. Finally, process 600 may return to block 602 where the steps in block 602-606 are repeated for all transceiver devices 104 and access points 116 of interest.

FIG. 7 illustrates a flow diagram of an exemplary process 700 used by an inference engine 110 of the wireless performance analysis system, as shown in FIG. 1, to determining connectivity information. At block 702, the inference engine 110 may read the data previously stored by one or more air monitors 104 from database 108 using data interface module 412. This data may include connectivity information. At block 704, inference engine 110 may determine location of the transceiver device 114 using a location analysis module (described in U.S. provisional patent application No. 60/890, 614 and filed on Feb. 19, 2007). At block 706, the inference engine 110 may analyze connectivity information. In some embodiments, the inference engine 100 may then reports results from the analyzed connectivity information that includes the existence of RF holes, the correlation between connectivity duration and location, and the identity of equipment that transmits bad frames.

At block 708, the inference engine may use the network interface module 414 to provide the analyzed connectivity information and/or results to one or more additional software applications via a wired network 102 and/or the Internet 112.

Conclusion

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
   receiving, with a plurality of air monitors, wireless packets transmitted between wireless devices; and
   selecting, for delivery to an application, performance information of the received wireless packets from one of the plurality of air monitors that has a highest level of confidence as determined from the received wireless packets.

2. The method as recited in claim 1 wherein the wireless packets are transmitted between an IEEE 802.11 compliant wireless transceiver and an IEEE 802.11 compliant wireless access point.

3. The method as recited in claim 1 wherein the plurality of air monitors each having a predetermined known location, and wherein the selecting from one of the plurality of air monitors is at least in part based on a location of the monitors.

4. The method as recited in claim 1 wherein the wireless packets are monitored by the plurality of air monitors over a predetermined analysis interval longer than a data submission interval.

5. The method as recited in claim 1 wherein the plurality of air monitors are connected via a wireline connection to a database, and wherein the plurality of air monitors store the performance information in the database via the wireline connection.

6. The method as recited in claim 1 wherein the one of the plurality of air monitors with the highest level of confidence is determined based on a packet count for the wireless signals received during a predetermined time period.

7. The method as recited in claim 1 further comprising selecting performance information from a second one of the plurality of air monitors having a second highest level of confidence.

8. The method as recited in claim 1 further comprising monitoring ACK packets transmitted between the wireless devices to correctly attribute a transmitter of the ACK packet.

9. The method as recited in claim 1 further comprising: determining with an inference engine, locations of the wireless devices; and correlating the performance information with inferred locations of the wireless devices.

10. A method comprising:
    Receiving, with a plurality of air monitors, wireless packets transmitted between wireless devices; and
    selecting, for delivery to an application, performance information of the received wireless packets from one of the plurality of air monitors that has a highest level of confidence, wherein the performance information is selected for delivery from a group of performance information comprising: byte count, data frame count, data frame byte count, null frame count, null frame byte count, management frame count, management frame byte count, control frame count, control frame byte count, retry frame count, retry frame byte count, frame loss rate, number of frames transmitted at each transmission speed, number of bytes transmitted at each transmission speed.

11. A system comprising:
    a first wireless device to transmit a wireless signal to a second wireless device; and
    a plurality of air monitors to monitor the wireless signals transmitted between the first and second wireless devices, to store connectivity information about the transmitted wireless signal and to aggregate the stored connectivity information; and
    an inference engine to determine transceiver device association states with the access point by analyzing a last packet type sent or received by the transceiver device, wherein the plurality of air monitors store connectivity information in a database, and wherein the plurality of air monitors are connected via a wireline network to the database.

12. The system as recited in claim 11 wherein the plurality of air monitors periodically transmit a wireless beacon signal to imitate an access point to induce one of the wireless devices to initiate an association process.

13. A system comprising:
    a first wireless device to transmit a wireless signal to a second wireless device, wherein the first device is an IEEE 802.11 compliant wireless transceiver device and the second wireless device is an IEEE 802.11 Access Point;
    a plurality of air monitors to monitor the wireless signals transmitted between the first and second wireless devices, to store connectivity information about the transmitted wireless signal and to aggregate the stored connectivity information, wherein the connectivity information is aggregated across multiple air monitors to provide more accurate information about states of the wireless transceiver device or access point; and an inference engine to analyzes the aggregated stored connectivity information to characterizes radio frequency (RF) holes, to indicate duration of associations of the wireless transceiver devices and the access points or to indicate locations where the wireless transceiver devices cannot maintain stable associations with the access point.

14. A system comprising:

a first wireless device to transmit a wireless signal to a second wireless device, wherein the first device is an IEEE 802.11 compliant wireless transceiver device and the second wireless device is an IEEE 802.11 Access Point; and a plurality of air monitors to monitor the wireless signals transmitted between the first and second wireless devices, to store connectivity information about the transmitted wireless signal and to aggregate the stored connectivity information, wherein the connectivity information is aggregated across multiple air monitors to provide more accurate information about states of the wireless transceiver device or access point;

wherein the air monitor monitors IEEE 802.11 compliant wireless signals, wherein the air monitors filter and store non-compliant 802.11 frames, and wherein the inference engine determines a location of the first wireless device generating the non-compliant frames and stores the determined location in a data store with the non-compliant frames.

15. A computer readable medium comprising computer-executable instructions that, when executed by one or more processors, cause the one or more processors to perform acts comprising:

receiving IEEE 802.11 compliant wireless signals transmitted between a wireless transceiver device and an access point;

storing signal performance information of the transmitted wireless signal with a plurality of air monitors, said performance information comprising: byte count, data frame count, data frame byte count, null frame count, null frame byte count, management frame count, management frame byte count, control frame count, control frame byte count, retry frame count, retry frame byte count, frame loss rate, number of frames transmitted at each transmission speed or a number of bytes transmitted at each transmission speed; and indicating the stored performance information stored by one of the plurality of air monitors that has a highest packet count for the wireless signals received during a predetermined time period.

16. The computer readable medium as recited in claim 15, wherein the computer-executable instructions, when executed, cause the one or more processors to perform further acts, comprising:

determining with an inference engine a location of the wireless transceiver device; and correlating the performance information with the location.

17. A method comprising:

receiving with a plurality of air monitors, wireless packets transmitted between wireless devices;

selecting, for delivery to an application, performance information of the received wireless packets from one of the plurality of air monitors that has a highest level of confidence, wherein some of the wireless packets are a data null frame; and detecting when a wireless transceiver switches to a different channel by monitoring a power-save mode bit within a data null frame.

* * * * *